United States Patent
De Torfino

[11] Patent Number: 5,959,451
[45] Date of Patent: Sep. 28, 1999

[54] METAL DETECTOR WITH VIBRATING TACTILE INDICATOR MOUNTED WITHIN A COMPACT HOUSING

[75] Inventor: Nicholas R. De Torfino, Lake Worth, Fla.

[73] Assignee: Torfino Enterprises, Inc., West Palm Beach, Fla.

[21] Appl. No.: 08/914,904

[22] Filed: Aug. 18, 1997

[51] Int. Cl.$^6$ .............................. G01V 3/11; G01N 27/72; G08B 6/00

[52] U.S. Cl. ........................... 324/236; 324/67; 324/327; 331/64; 340/407.1; 340/551

[58] Field of Search ................................ 324/67, 207.16, 324/207.26, 236, 237, 327, 328, 329; 307/116; 331/64, 65; 340/551, 552, 572, 407.1; 361/181; 116/205

[56] References Cited

U.S. PATENT DOCUMENTS

| | | |
|---|---|---|
| 2,393,717 | 1/1946 | Speaker ................................. 324/236 X |
| 3,601,691 | 8/1971 | Gardiner .................................. 324/327 |
| 3,662,255 | 5/1972 | Garrett . |
| 3,714,563 | 1/1973 | Voll ............................................. 324/67 |
| 3,769,575 | 10/1973 | Rist et al. ............................ 324/236 X |
| 3,875,498 | 4/1975 | Mahan et al. . |
| 4,000,459 | 12/1976 | Little ..................................... 324/207.26 |
| 4,021,725 | 5/1977 | Kirkland . |
| 4,096,432 | 6/1978 | Spencer . |
| 4,204,160 | 5/1980 | Voll ......................................... 324/236 |
| 4,345,208 | 8/1982 | Wilson . |
| 4,357,535 | 11/1982 | Haas . |
| 4,423,377 | 12/1983 | Podhrasky . |
| 4,526,177 | 7/1985 | Rudy et al. . |
| 4,837,489 | 6/1989 | McFee . |
| 4,945,305 | 7/1990 | Blood . |
| 4,992,741 | 2/1991 | Douglas et al. . |
| 5,086,290 | 2/1992 | Murray et al. . |
| 5,097,211 | 3/1992 | Schonstedt . |
| 5,138,761 | 8/1992 | Schonstedt . |
| 5,299,227 | 3/1994 | Rose . |
| 5,311,126 | 5/1994 | Mittleman et al. .................. 324/258 X |
| 5,373,241 | 12/1994 | Ham, Jr. et al. ......................... 324/536 |
| 5,414,411 | 5/1995 | Lahr ...................................... 324/329 X |
| 5,425,267 | 6/1995 | Shapiro et al. . |
| 5,519,317 | 5/1996 | Guichard et al. . |
| 5,552,705 | 9/1996 | Keller . |
| 5,619,181 | 4/1997 | Murray ................................. 340/407.1 |

FOREIGN PATENT DOCUMENTS

| | | | |
|---|---|---|---|
| 2011086 | 7/1979 | United Kingdom .................... 324/236 |

OTHER PUBLICATIONS

Simonton, Jr, John S.; "Carpenter'Mate", *Popular Electronics*, Sep. 1969, pp. 69–72.

*Primary Examiner*—Gerard Strecker
*Attorney, Agent, or Firm*—Quarles & Brady LLP

[57] ABSTRACT

A compact hand-held metal detector that detects small ferrous and non-ferrous metal objects, that has a detection pattern in three planes, and that includes a plurality of detection alarm indications including visual, audio, and tactile detection alarm indications is provided. The invention includes a single small detection coil combined with an electronic control circuit that permits the coil and associated electronic components to be mounted adjacent each other in a compact enclosure. The coil provides a spherical detection pattern that is active in all three planes which detects metal objects in any orientation with respect to the coil. Upon detection of a metal object, the detector provides a visual and audio or tactile alarm indication.

10 Claims, 6 Drawing Sheets

METAL DETECTOR WITH VIBRATING TACTILE INDICATOR MOUNTED WITHIN A COMPACT HOUSING

BACKGROUND OF THE INVENTION

1. Field of the Invention

The present invention relates to metal detectors, and more particularly to a compact hand-held metal detector having a three dimensional detection region, and visual, audible, and tactile indication modes.

2. Description of Related Art

Concealed weapons are a concern for law enforcement personnel, emergency medical personnel, and others. Typically, law enforcement personnel must frisk an apprehended suspect to search for weapons, thereby risking punctures and/or cuts from sharp, and potentially contaminated, concealed objects.

Emergency medical personnel may accidentally find concealed weapons during physical examinations resulting in similar risks. Additionally, an unconscious or semi-conscious patient may awaken and attack the medical personnel with undiscovered concealed weapons.

Metal detectors are known in the art, and can be utilized by law enforcement and emergency medical personnel to locate concealed weapons in the above circumstances. In addition, metal detectors are used in industrial and other applications for inspection and screening for metal in and on various objects, and other applications. For example, automobile manufacturers may want to inspect the carpeted interiors of automobiles for metal contaminants prior to shipment. Hunters may want to inspect game for bullets and shell fragments during dressing and prior to consuming the game.

However, due to the size of available metal detectors, they are typically inconvenient to carry and use. The large size of metal detectors is in part due to large transmit and receive coils needed increase sensitivity to detect small objects, and the requirement to keep the coils away from the receiver electronics to avoid interference and false alarms.

In addition, to date, metal detector's target acquisition indications have included audio oscillators that produce loud audible signals. If a suspect observes law enforcement or medical personnel preparing to use a large metal detector that may locate a concealed weapon, or realizes that a metal detector has located a weapon by hearing a loud audible alarm indication, the suspect may panic and pull the weapon endangering the law enforcement or medical personnel. In addition, audible alarms may be difficult to hear in very noisy environments.

Some metal detectors have been equipped with earphones in an attempt to eliminate the loud audible alarm signal. However, earphones are not practical for field use because of the restrictions imposed by the earphone wire possibly becoming tangled or broken.

Most metal detectors known in the art utilize a tuned oscillator incorporating a separate receive and transmit coil. Metal is detected by frequency changes or shifts in the oscillator that occur when the transmit and receive coils are brought near a metal object. However, generally for detection, the detector must be moved in relation to the object. If the detector stops moving, even while in the vicinity of a metal object, the object will no longer be detected.

In addition, most detectors have a single active detection region requiring the detector to be held in a specific orientation to position metal objects in the active detection region. The directional limitation of metal detectors increases the risk that a metal object could be missed by not properly orienting the detector's active detection region in relation to the metal object.

An example of a small metal detector is disclosed in U.S. Pat. No. 4,423,377 to Podhrasky (the '377 patent). The device of the '377 patent includes a transmit coil and a receive coil in planar relationship, and a planar circuit board adjacent and parallel the transmit and receive coils with electronic components strategically positioned thereon. The transmit coil radiates energy at approximately 90 khz. A conductive target produces a change in the magnetic coupling between the transmit and receive coils. When the rate of change of magnetic coupling exceeds a threshold value, a visual and audible signal is produced. However, if the detector remains motionless relative to the conductive object, the rate of change of magnetic coupling drops below the threshold value, and the alarm signal(s) stop.

The positioning of the electronic components on the circuit board reduces magnetic coupling between the transmit and receive coils and the electronic circuit of the device. Because of the configuration of the coils and placement of the circuit board, the scan area is inherently directional. The scan area is essentially perpendicular to a plane containing the coils and circuit board, and points in the direction away from the coils opposite the circuit board. The scan area is disclosed as covering about 80% of the length of the case. Therefore, objects in the active scan area must be directly below the unit's housing.

The audible signal can be turned off, leaving only the visual signal to alert the operator of an acquired conductive target. Because the directional requirements of the active detection region requires the unit to be held in a specific orientation for detection, a visual only alarm could be difficult to monitor while conducting a search. A detection indication could be missed if the visual indicator were held in a position that prevented or restricted viewing.

The device disclosed in the '377 patent clearly exhibits several of the limitations discussed above.

Therefore, there is a need for a metal detector that is sensitive enough to detect small ferrous and non-ferrous metal objects, but is compact to be easily carried and used. The metal detector should include an alarm indication that prevents the suspect from being alerted to the discovery of a concealed weapon, but is easy to use without missing detection indications. In addition, there is a need for the active detection region of the metal detector to be active in all planes to ease operation of the detector.

SUMMARY OF THE INVENTION

The present invention provides a compact metal detector that can be hand-held, that can be sensitive enough to detect small ferrous and non-ferrous metal objects, that has a detection pattern in three planes, and that can include a plurality of detection alarm indications including visual, audio, and tactile detection alarm indications.

The invention includes a single small coil configuration combined with an electronic control circuit that permits the coil and associated electronic components to be mounted adjacent each other in a compact enclosure. The coil provides a spherical detection region (active in all three planes) that detects ferrous and non-ferrous metal objects that can be in any orientation with respect to the coil. (Ferrous and non-ferrous metal objects are hereinafter referred to as metal objects).

The coil can be made of a predetermined size of non-linear ferrite core material with a preselected number of wraps or turns of a preselected size wire providing equal sensitivity on all sides of the coil.

The electronic control circuit includes an oscillator section, a detection section, an alarm driver section, and voltage regulation to maintain sensitivity as battery voltage declines. For example, for operation on a 9 volt battery, sensitivity is not effected by voltages as low as 4 volts. The electronic control circuit has extremely low battery consumption, and can provide an estimated 200 or more hours of use from a conventional 9 volt battery.

Power can be applied by a manual power switch preferably located on the exterior of the enclosure. The battery condition can be checked each time power is applied to the electronic control circuit.

The oscillator, which utilizes the coil described above, is self-oscillating at a preselected frequency which is preferably in the range of approximately 340 khz to 380 khz. The high frequency of operation for the present invention, in comparison to conventional metal detectors, increases sensitivity and detection speed.

The oscillator is activated whenever detection is desired by the operator. The oscillator can be activated by an operator controlled manual detection switch preferably located on the exterior of the enclosure. The detection switch is preferably a momentary push-button switch, and can activate the oscillator, detection circuit, and the other electronic control circuitry needed for detection.

Instead of detecting frequency shifts as in conventional metal detectors, the detection circuit of the present invention detects changes in the "Q" of the oscillator circuit, and triggers the alarm driver circuit when a comparator set-point is exceeded. The comparator set-point can be initially set by a first potentiometer, preferably internal to the enclosure, to a sensitivity that provides detection, at the minimum, of a metal object substantially equivalent to a small .22 cal. handgun. A second potentiometer, preferably external to the enclosure, can then be adjusted to a preselected sensitivity level to detect metal objects as small as a hat pin at a detection distance of one inch.

Once the first potentiometer has been preset, whenever the invention is turned-on or activated, detection of a minimum of the equivalent of a .22 cal. handgun is immediately available. Further adjustment of the second potentiometer is not required unless additional sensitivity is required. Therefore, the invention is preferably immediately operable upon power-up, without the necessity of pre-use adjustment.

Upon detection of a metal object, the alarm driver portion of the circuit can be activated, providing a visual and audio or tactile alarm indication, as described herein below.

The electronic control circuit's alarm driver can provide a dual color visual indicator, such as high intensity LED that is visible in daylight, and which can glow a first color to indicate power is on, and a second color to indicate that metal has been detected. In one embodiment, the first color of the visual indicator can be green and the second color can be red. Alternately, multiple single indication lights or LEDs, as known in the art, can be provided to indicate power-on and detection modes. In addition to the visual alarm indication, an audible alarm can be sounded upon detection of metal.

A tactile mode can also be selected, preferably by an operator controlled manual switch located on the exterior of the enclosure. Preferably, if the tactile indication mode is selected, the audio mode can be disabled to provide an alarm indication solely for the operator of the invention.

In one embodiment, the tactile indication is provided by vibration. The vibration mode is tactually felt by the operator of the invention holding the enclosure, thus preventing others from overhearing the alarm indication. The tactile indication can also be useful for noisy environments where the audible alarm might not be heard.

In one embodiment, the vibration mode can be provided by a motor with a rotating offset counterweight to generate vibration. A motor and counterweight generate a varying electromagnetic field, which interferes with sensitivity and generates false alarms in conventional detection circuits, including those circuits that detect frequency shifts. This is one of the reasons why conventional metal detectors have heretofore not included vibration as a mode of indication for detection. However, the vibrating motor has no effect on the sensitivity, nor does it create false alarms, in the present invention. Hence, an effective tactile indication is provided to the operator of the present invention.

In operation, for one embodiment, once the power switch is turned on and the detection switch is depressed, the invention can detect metal objects of a minimum of substantially the size of a small .22 cal. handgun, as described above. The power switch can be combined with the external potentiometer. When the power switch is turned on and the detection switch is depressed, the visual indicator, which can be a bi-color LED, can glow a first color, such as green.

To increase sensitivity, the external potentiometer can be rotated while the detection switch is depressed. At some point the LED will switch from the first color to the second color, which can be red, at which point the maximum sensitivity has been exceeded. The potentiometer is then turned back until the LED again glows the first color (green), which is the set-point for operation at maximum sensitivity. At maximum sensitivity, metal objects substantially the size of a hat pin can be detected at a distance of approximately one inch.

The present invention will detect metal objects within the active detection region regardless whether the invention is moving or stationary in relation to the target metal object. Furthermore, due in part to the preselected frequency of operation of the present invention, metal objects can be detected even if they are moving relative to the detection coil at a maximum rate of better than 2 feet per second.

In addition, the present invention can operate over a wide temperature range without sensitivity or detection range degradation.

Accordingly, it is an object of the present invention to provide a compact metal detector that has a spherical (active in all three planes) detection region utilizing a single detection coil.

It is another objective of the present invention to provide a compact metal detector that provides a plurality of detection alarm indications including visual, audio, and tactile detection alarm indications without affecting sensitivity or inducing false alarms.

It is still another objective of the present invention to provide a compact metal detector that provides high sensitivity that detects both small ferrous and non-ferrous metal objects.

It is a further objective of the present invention to provide a compact metal detector that has low power consumption and includes voltage regulation that permits operation on degraded battery voltages without effecting sensitivity, and is operable over a wide temperature range.

It is still a further objective of the present invention to provide a compact metal detector that detects changes in the "Q" of the oscillator circuit, and can detect metal objects moving relative to the detector at a maximum rate of over 2 feet per second.

In accordance with these and other objects which will become apparent hereinafter, the instant invention will now be described with particular reference to the accompanying drawings.

DESCRIPTION OF THE PREFERRED EMBODIMENTS

Figure 1:
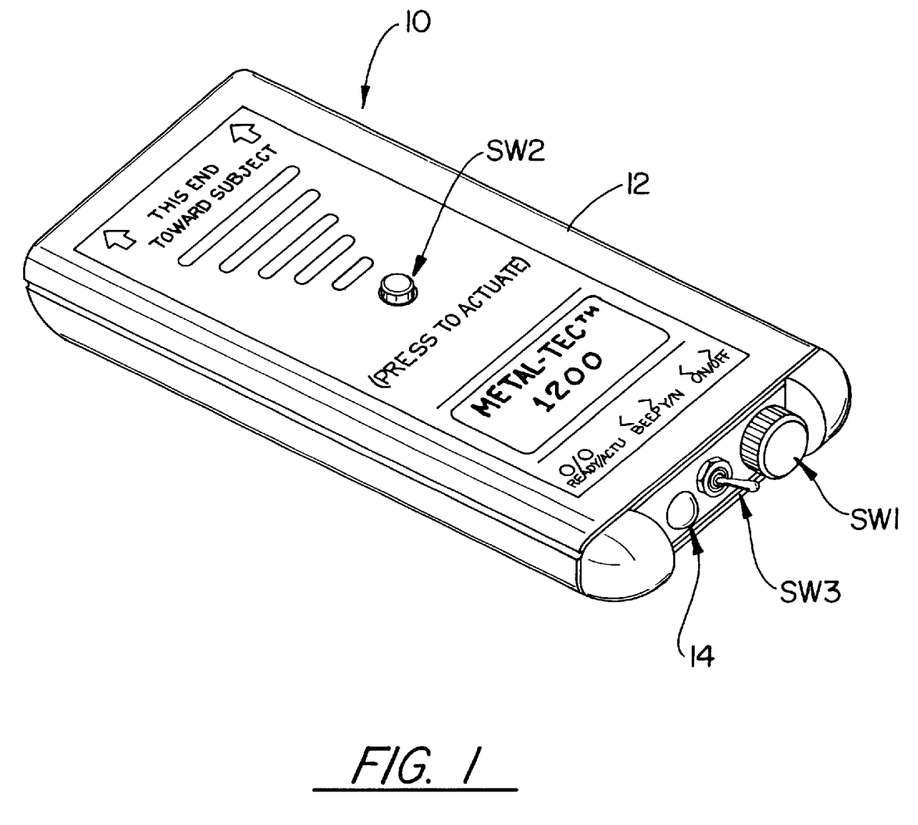
FIG. 1 is a perspective view of one embodiment of the present invention.

Referring to FIG. 1, the preferred embodiment of the present invention is illustrated generally as 10, which includes a hand-held compact enclosure 12. Compact enclosure 12 can include sensitivity adjustment potentiometer and combination power switch SW1, detection momentary push-button switch SW2, dual color visual indicator 14, and detection alarm indication mode selection switch SW3, each of which are fully described herein below.

Hand-held compact enclosure 12 can be made of an ABS high impact plastic or equivalent material that can withstand the abuses of everyday use of the invention in the field. The physical size of enclosure 12 can be preselected to be comfortably held in the hand of a user, while housing the coil, battery, electronic control circuit, and detection alarm indicators, as described herein below. For example, one embodiment for enclosure 12 can be approximately seven inches long by three inches wide by one inch deep (7"×3"× 1").

The present invention includes a detection coil and electronic circuitry as fully described herein below, and which in the preferred embodiment can be housed internally within enclosure 12. The following description is provided for the preferred embodiment of the present invention, but it should be understood that many of the parameters are design choices and can be altered to produce other embodiments that are considered within the scope of the invention.

Figure 2:
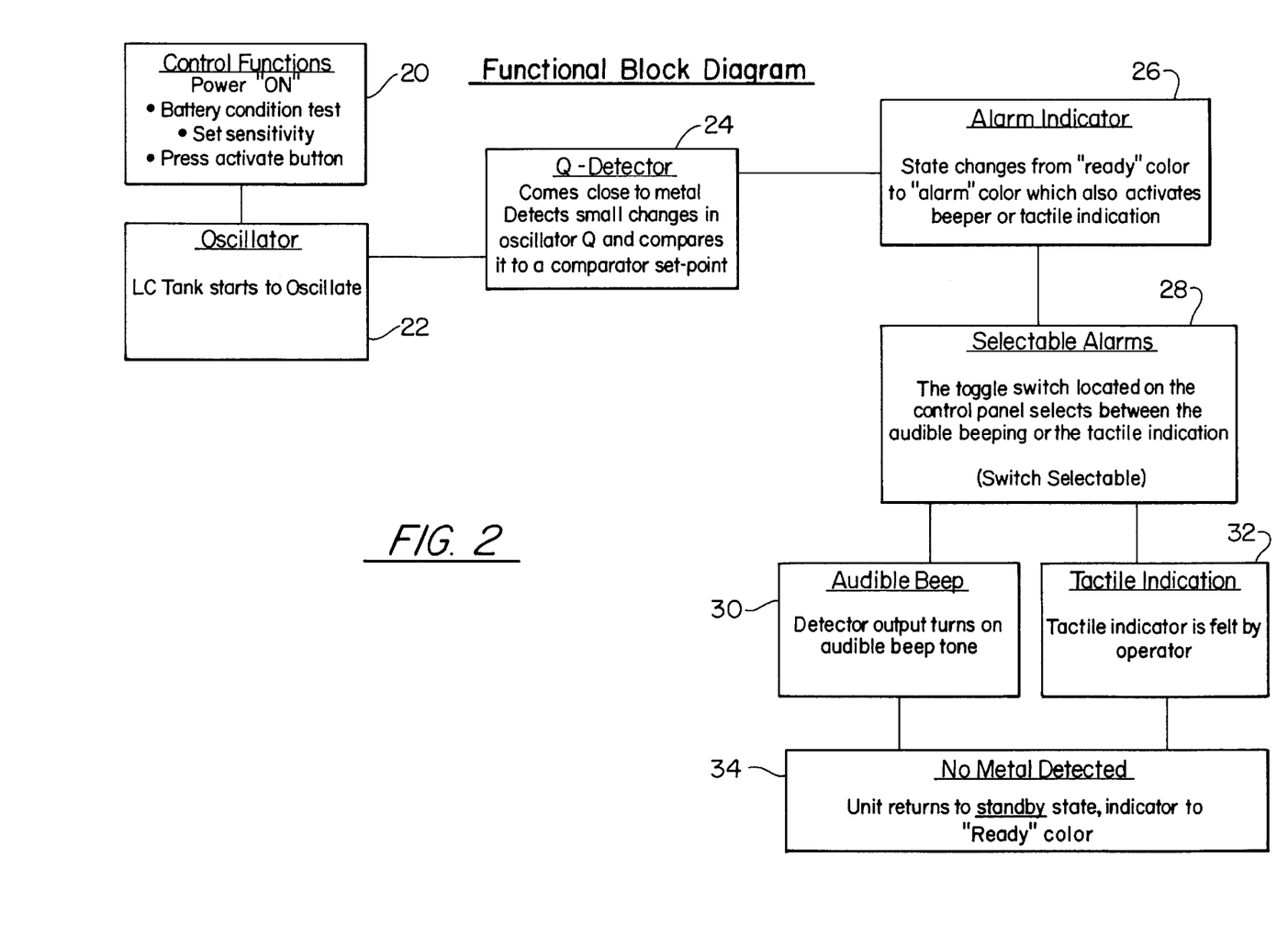
FIG. 2 is a functional block diagram of one embodiment of the present invention.

Referring to FIG. 2, a block diagram illustrates the functional flow for operation of the preferred embodiment of the present invention. As fully described herein below, operation of the system commences at control function block 20 by turning power on, such as by SW1 (FIG. 1). Detection switch SW2, starts oscillator circuit 22 and detector circuit 24. Once oscillator 22 is oscillating, sensitivity can be set. Sensitivity can be initially set such that immediately upon activation of SW2, the detector 24 will always detect ferrous or non-ferrous metal objects to a minimum size equivalent to approximately a small .22 cal. handgun. To increase sensitivity to detect smaller objects, a potentiometer, that can be physically combined with SW1 on enclosure 12, can be adjusted, as fully described herein below.

Once activated, when the detection coil comes near ferrous or non-ferrous metal 24, small changes in the oscillator circuit's quality factor or "Q" are detected. If the change in "Q" is larger than a preset comparator set-point, a visual alarm indicator 26 is activated and can change color from a "ready" color to an "alarm" color. The "ready" color comes on with detection switch SW2. The "ready" color can be green, and the "alarm" color can be red, or the colors can be preselected to any two suitable colors.

Simultaneous with activation of visual alarm 26, an audible alarm 30 or a tactile alarm 32 can be activated depending upon the selection of a switch 28, such as SW3 on enclosure 12. Tactile alarm 32 can be any alarm mode capable of tactile sensing by a user, such as vibration. If no metal is detected, the unit remains in the ready state with the visual indicator glowing the "ready" color as long as switch SW2 is depressed. A detailed description of how the above operation of the present invention is implemented in the preferred embodiment follows.

Figure 3A:
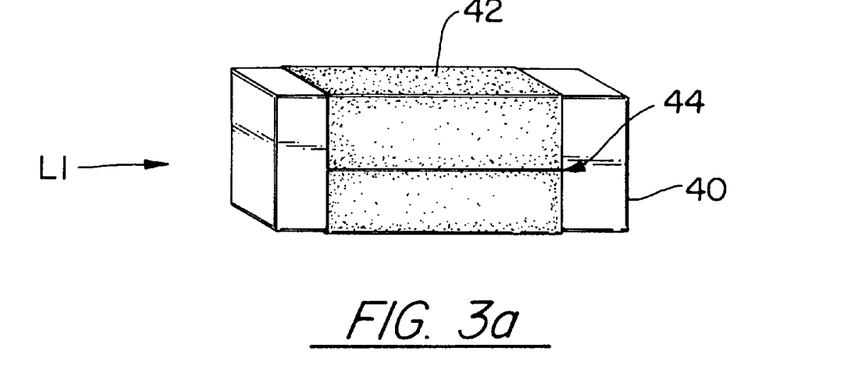
FIGS. 3a, 3b, and 3c illustrate the detection coil of the present invention in sequential stages of assembly.
Figure 3B:
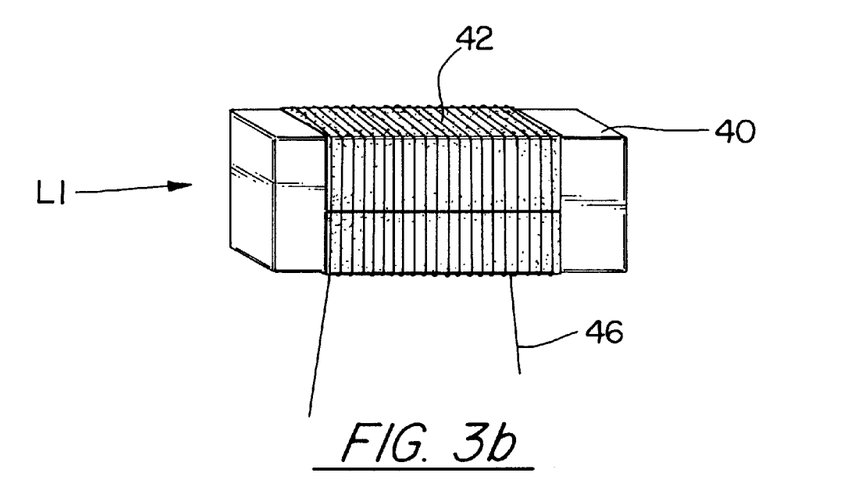
Figure 3C:
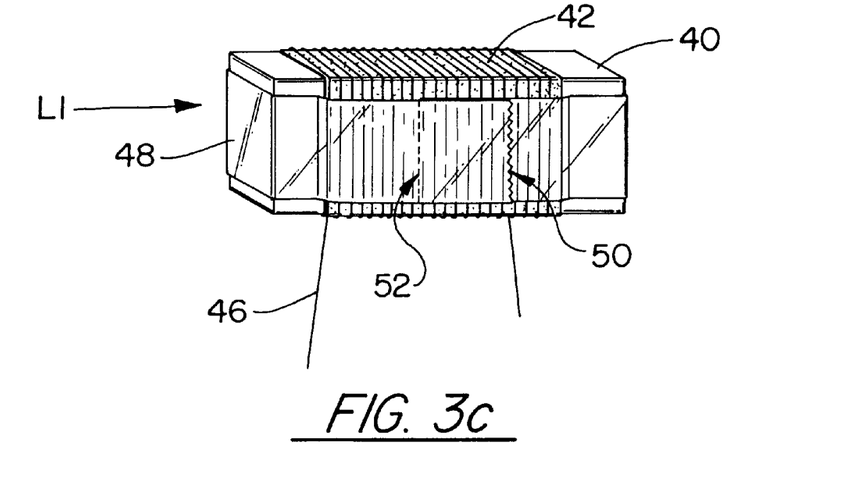

Referring to FIGS. 3a–3c, the detection coil L1 is illustrated in sequential stages of assembly. Referring first to FIG. 3a, coil L1 includes core 40 which can be a preselected size of a conventional non-linear ferrite material. The size of core 40 is predetermined according to various design parameters such as the desired final size of the enclosure 12 the desired field strength and size of the detection region. For example, in one embodiment the core 40 can be a rectangular rod of approximately 2.18 inches in length by approximately 0.82 inches in height and 0.35 inches in width.

Core 40 is wrapped with double stick tape 42. The ends of tape 42 meet at non-overlapping seam 44, which is preferably located on a flat side of core 40, as illustrated in FIG. 3a.

Referring to FIG. 3b, core 40 is next wrapped with a preselected number of turns of a preselected gauge (awg) wire 46. The number of turns and gauge wire are predetermined according to various design parameters to determine the detection region size and strength, and the like. For example, in one embodiment 26 turns of #26 awg wire 46 is wrapped onto core 40. The windings of wire 46 are evenly spaced and wrapped upon double stick tape 42.

Referring to FIG. 3c, the final step is to wrap transformer tape 48 around wire 46 such that tape end 50 overlaps tape end 52 by a suitable amount such as least one inch. Tape 48 secures wire 46 to finish assembly of coil L1.

Coil L1 forms part of the oscillator, which preferably oscillates in the range of approximately 340 khz to 380 khz, which is utilized for detection of ferrous and non-ferrous metal objects. The preferred embodiment of coil L1 described herein above electrically has a value of approximately 100 $\mu$H.

Coil L1 provides an active detection region that is substantially spherical, or that detects in all three planes, in relation to coil L1. This means that the detector enclosure 12, which houses coil L1, can be held in any position relative to a metal object and the metal object will be in the active detection region. Detection of the metal object will depend upon the size of the object, and the set-point of the detector's sensitivity, as fully described herein below.

Figure 4A:
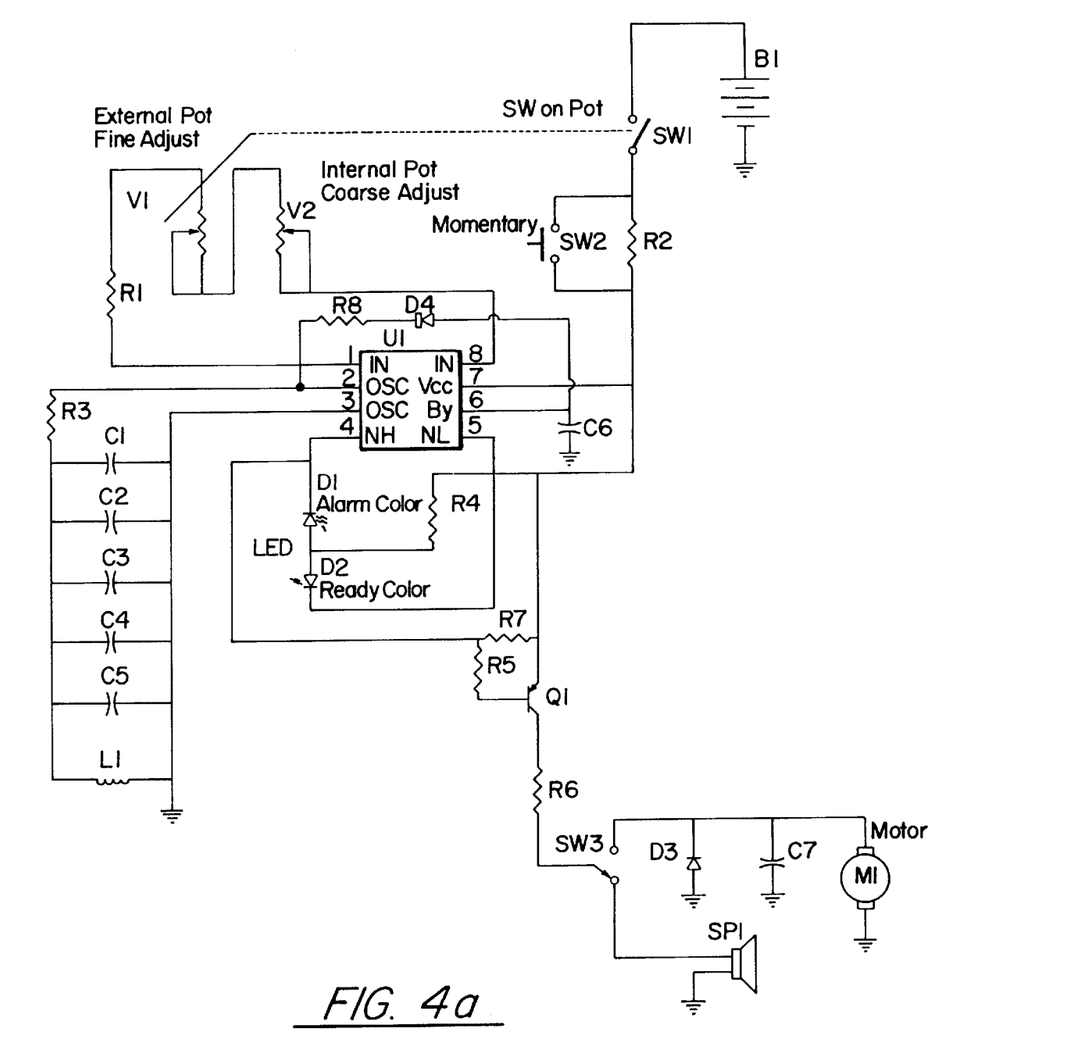
FIGS. 4a and 4b are schematic diagrams of one embodiment of the present invention.

Referring to FIG. 4a, coil L1 combines with a plurality of capacitors C1–C5, and R3, in an LC tank circuit, to provide the tuned oscillator portion of the detection circuit of the present invention. Capacitors C1–C5 can be a preselected number of capacitors having a predetermined valve. In the embodiment utilizing the 100 $\mu$H coil L1 described above, the capacitors can have a value of 0.001 $\mu$F. The oscillator can be tuned to oscillate at a predetermined frequency, preferably in the range of 340 khz to 380 khz, and preferably at approximately 350 khz.

System operation is commenced by turning power on by SW1. Upon activation of SW1, battery B1 voltage is applied to the circuit. Battery B1 can be preselected to be nearly any voltage or size battery preferably in the range of approximately 4 volts to 25 volts, and preferably can be a 9 volt battery.

Figure 4B:
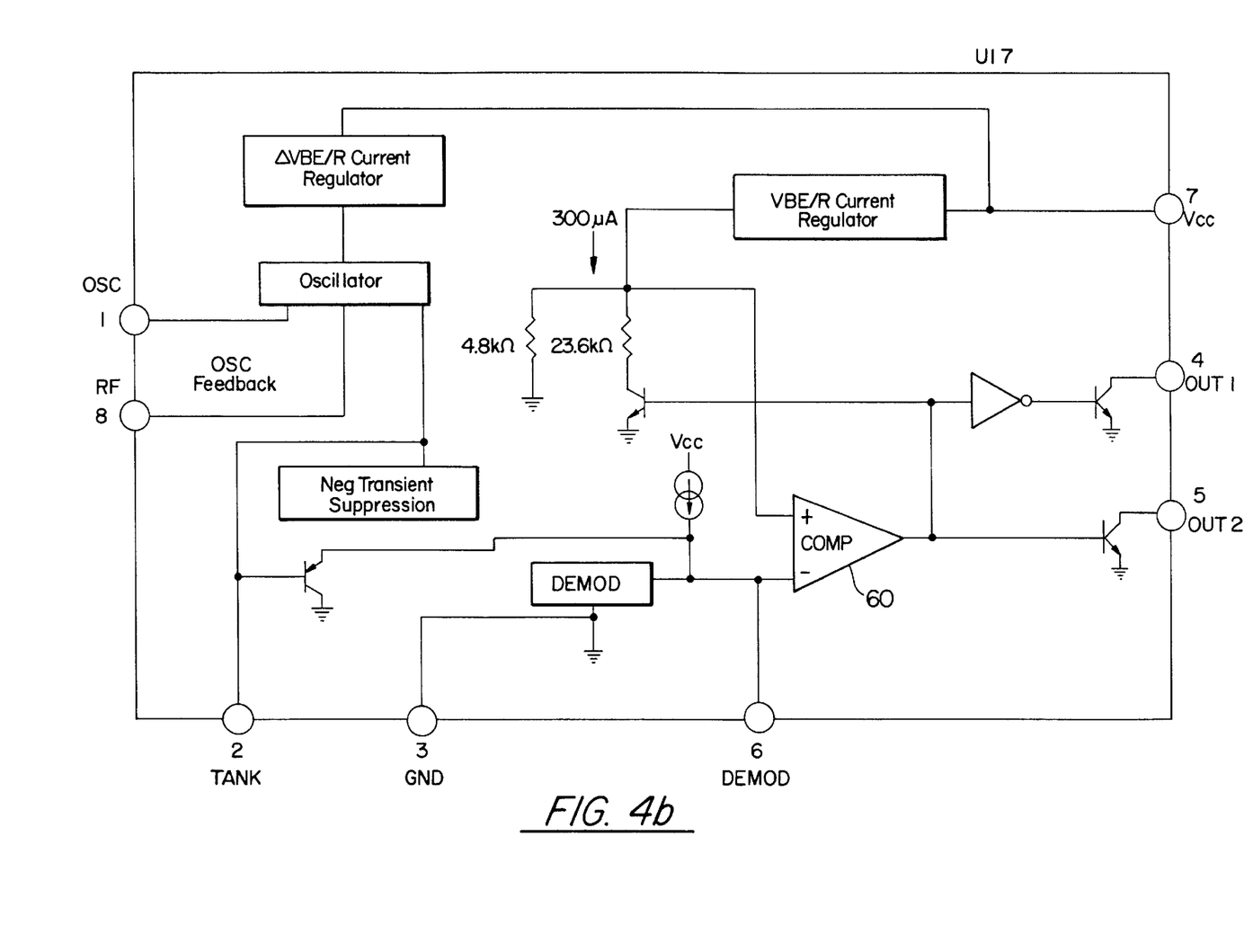

Referring now to FIGS. 4a and 4b. Switch SW2 activates the oscillator and detection portion of the circuit. The oscillator includes coil L1 and capacitors C1–C5, and the detection portion of the circuit includes U1. Switch SW2 supplies power to pin 7 of U1 and causes the oscillator, which is connected to pins 2 and 3 of U1, to oscillate at the frequency specified herein above.

Switch SW2 also applies power through R4 to the anodes of D1 and D2. D1 and D2 can be light emitting diodes (LED) that form dual color visual indicator 14, on enclosure 12. When D1 is on, indicator 14 will glow a first color, and when D2 is on indicator 14 will glow a second color.

The cathode of D1 is connected to pin 4 of U1, the cathode of D2 is connected to pin 5 of U1. When switch SW2 supplies power to pin 7 of U1, the output at pin 5 will be normally low (NL). The output at pin 4, which is the inverted output of pin 5, will be normally high (NH). When switch SW2 supplies power to pin 7 of U1, power is simultaneously applied through R4 to the anodes of D1 and D2. The cathode of D2 is connected to pin 5 of U1 which will be at the normally low (NL) state. Therefore D2 will turn on causing indicator 14 to glow the second color. The cathode of D1 is connected to pin 4 of U1, which will be NH, and D1 will therefore be off, when D2 is on.

The second color can be considered the "ready" color to indicate that the system is in the detection state with power on and the oscillator and detector circuit portions active. The ready color can be preselected to be any suitable color, such as green.

When the detector detects metal, as fully described herein below, the outputs at pins 4 and 5 of U1 switch states. Pin 5 will switch from NL to high, turning off D1. Pin 4 will switch from NH to low turning on D1, thus causing indicator 14 to switch from the second color to the first color. The first color can be considered the "alarm" color to indicate that the system has detected metal. The alarm color can be preselected to be any suitable color, such as red.

When pin 4 of U1 switches state from NH to low upon metal detection, Q1 will turn on activating a second alarm. A "second" alarm because the indicator 14 switching to the alarm color is a "first" alarm. The second alarm depends upon the position of switch SW3. If switch SW3 is in a first position, speaker SP1 will emit an audible alarm. If switch SW3 is in a second position, motor M1 will turn on causing a tactually felt vibration. Motor M1 can be nearly any device that produces a tactually felt response. In one embodiment, motor M1 can be a motor with a rotating offset counterweight that produces vibration.

Switch SW3 can include nearly any number of additional poles that can be utilized to activate nearly any number of additional alarm indications. All of the alarm indications are responsive to the switching states of pins 4 and 5 of U1 which change state in response to the detection of metal, as fully described below.

As stated above, switch SW2 supplies power to pin 7 of U1 and causes the oscillator, which is connected to pins 2 and 3 of U1, to oscillate at the frequency specified herein above. When switch SW2 initially activates the oscillator, coarse sensitivity can be preset to allow the detector to detect an object of a preselected minimum size. Once the coarse sensitivity is preset, it does not need to be adjusted further and can be kept in the preset position. Fine adjustment of the sensitivity can be utilized to provide the maximum detection sensitivity possible (detection of the smallest amount of metal), once the coarse adjustment has been made.

Sensitivity is adjusted by internal coarse adjustment potentiometer V2, external fine adjust potentiometer V1, and resistor R1, which are all connected in series across pins 1 and 8 of U1. V2 is preferably housed internal to enclosure 12, and V1 external to enclosure 12, with V1 preferably physically in combination with SW1. Potentiometers V1 and V2, can be any suitable devices used to change a resistance value, as known in the art.

The circuit works by keeping the equivalent impedance of the coil and capacitors across pins 2 and 3 of U1 greater than the feedback resistance across pins 1 and 8 to ensure that oscillations continue. The impedance of the tank is determined mainly by the inductor so that when metal is brought close to the coil it changes the impedance and the oscillations decrease since the impedance of the coil matches that of the feedback resistance. Oscillations would stop except that there is an internal current source to effectively reduce the value of the feedback resistance and allow oscillations to continue. The amplitude of the oscillations set the voltage on the Demod capacitor C6. The DC voltage is compared to the reference voltage and the comparator is tripped at the appropriate point. Adjusting the resistance value across pins 1 and 8 adjusts the point at which the impedance of the tank circuit will have to reach before the comparator will trip.

Pin 6 is an output, and is the rectified representation of the signal from the tank circuit. It is a peak detector output voltage stored in capacitor C6 and compared to the reference voltage at the comparator. The Demodulator is really only a peak detector. The transistor connected to pin 2 is turned on every negative cycle of the oscillating waveform at the tank circuit connected across pins 2 and 3. The transistor shunts current away from the Demod pin 6 so capacitor C6 does not charge as much when the tank oscillation is of a high amplitude, as when there is no metal close to the coil. As metal comes near to the coil L1, the amplitude of the oscillation of the tank circuit decreases so the transistor is not turned on for as long a period of time. The charge on the Demod capacitor C6 is thus allowed to build up and eventually reaches the point at which it trips the comparator.

R8 and D4 slightly increases the negative voltage present on the Demod capacitor C6 thus reducing the trigger level of the comparator. The trigger level is thus made lower which in turn makes the circuit more sensitive to smaller metal objects.

The sensitivity adjustment across pins 1 and 8 of U1 sets the point at which the output of the comparator (60 in FIG. 4b), at pin 5 of U1, goes from a normally low (NL) state to a high state. The comparator senses a change in the quality factor or "Q" of the oscillator circuit connected across pins 2 and 3 of U1. (Input to the comparator can be seen at pin 6 of U1, as shown in FIG. 4b).

Internal coarse adjustment potentiometer V2 can be utilized to set the sensitivity such that whenever SW2 applies power to pin 7 of U1, the detector can immediately sense a change in the "Q" of the oscillator circuit resulting from a metal object, of a preselected size, coming near coil L1. The minimum size metal object can be preselected to be approximately the size of a small .22 cal. handgun. Once V2 has been initially adjusted, it can remain as a preset minimum comparator set-point.

Changes in Q of the oscillator circuit, connected across pins 2 and 3 of U1, are sensed by the comparator at pin 6.

Adjustment of V2, which is connected across pins 1 and 8 of U1, changes the oscillator feedback value which sets the relative comparator input value at pin 6 of U1.

External fine adjustment potentiometer V1 can be adjusted to obtain maximum sensitivity. To set the maximum sensitivity using V1, switch SW2 is first turned on. Potentiometer V1 is then rotated, turning on switch SW1, and changing the resistive valve across pins 1 and 8 of U1. The change in resistive value across pins 1 and 8 of U1, changes the relative comparator input value at pin 6. As mentioned above, D2 will now be on and indicator 14 will glow the ready color.

Increasing sensitivity has the effect of reducing the difference between the "−" input and the "+" reference of the comparator 60. The comparator changes state when the "−" input substantially reaches the "+" input level. Reducing the difference between the input at pin 6 (−) and the reference (+) input means that minor changes in the Q of the oscillator circuit connected across pins 2 and 3, which is seen at pin 6 the "−" input to comparator 60, will cause the output of comparator 60 to change state.

Reducing sensitivity has the effect of increasing the difference between the "−" input and the "+" reference of the comparator 60. Increasing the difference between the input at pin 6 (−) and the reference (+) input means that relatively large changes in the Q of the oscillator circuit will be needed to cause the output of comparator 60 to change state.

Now, as rotation of V1 continues, input to the comparator at pin 6 will, at some point, become substantially equal to the comparator "+" input, and the comparator output at pin 5 will change state from NL to high. The inverted output at pin 4 will simultaneously switch from NH to low. D2 will turn off and D1 will turn on, changing the visual indicator 14 from the ready color to the alarm color.

V1 is then rotated in reverse direction until the comparator output at pin 5 and pin 4 changes state back to NL and NH, respectively, and indicator 14 changes back to the ready color. At this point, the input to comparator 60 at pin 6 (−), and the reference input (+), have the minimum separation possible without triggering the comparator. The highest sensitivity has therefore been set, and the smallest change in Q will cause the comparator to change state, setting off the alarms, as described herein above.

Once the fine adjustment of V1 is complete and maximum sensitivity has been set, SW2 can be released. As long as the position of V1 remains unchanged, whenever SW2 is activated, the detector remains set at the maximum sensitivity. At maximum sensitivity in the above described embodiment, a small piece of metal approximately the size of a hat pin, at a distance of approximately one inch from coil L1, will cause a change in the Q of the oscillator circuit enough to trigger comparator 60 to change state at output pins 4 and 5, setting off the selected alarms.

The minimum and maximum detection capability (size of metal required to trigger alarms) are preselected quantities, and are predetermined by design parameter considerations. The embodiment herein described discusses minimum and maximum values for the preferred embodiment, it should be understood that these values can vary for other embodiment of the invention. Furthermore, it should be understood that electronic circuitry described above for the preferred embodiment can have alternate implementations for other embodiments which are considered within the scope of the present invention.

In the preferred embodiment, as mentioned above, battery B1 is selected to be a 9 volt battery. The circuit illustrated in FIGS. 4*a* and 4*b* draws very little current, and can provide normal operation estimated at over 200 hours from a conventional 9 volt alkaline battery. The circuit can operate down to approximately 4 volts. At some voltage below 4 volts, current regulation in U1 causes the output of comparator 60 at pin 5 to go high, and the inverted output at pin 4 will be low. D1 will then come on and stay on, causing indicator 14 to glow the alarm color to indicate that the battery voltage is insufficient for operation. Each time power is applied by activating switch SW1, if battery voltage is below the minimum allowable for operation, indicator 14 will glow the alarm color. Therefore, an automatic battery test is performed each time power is applied to the circuit.

Figure 5:
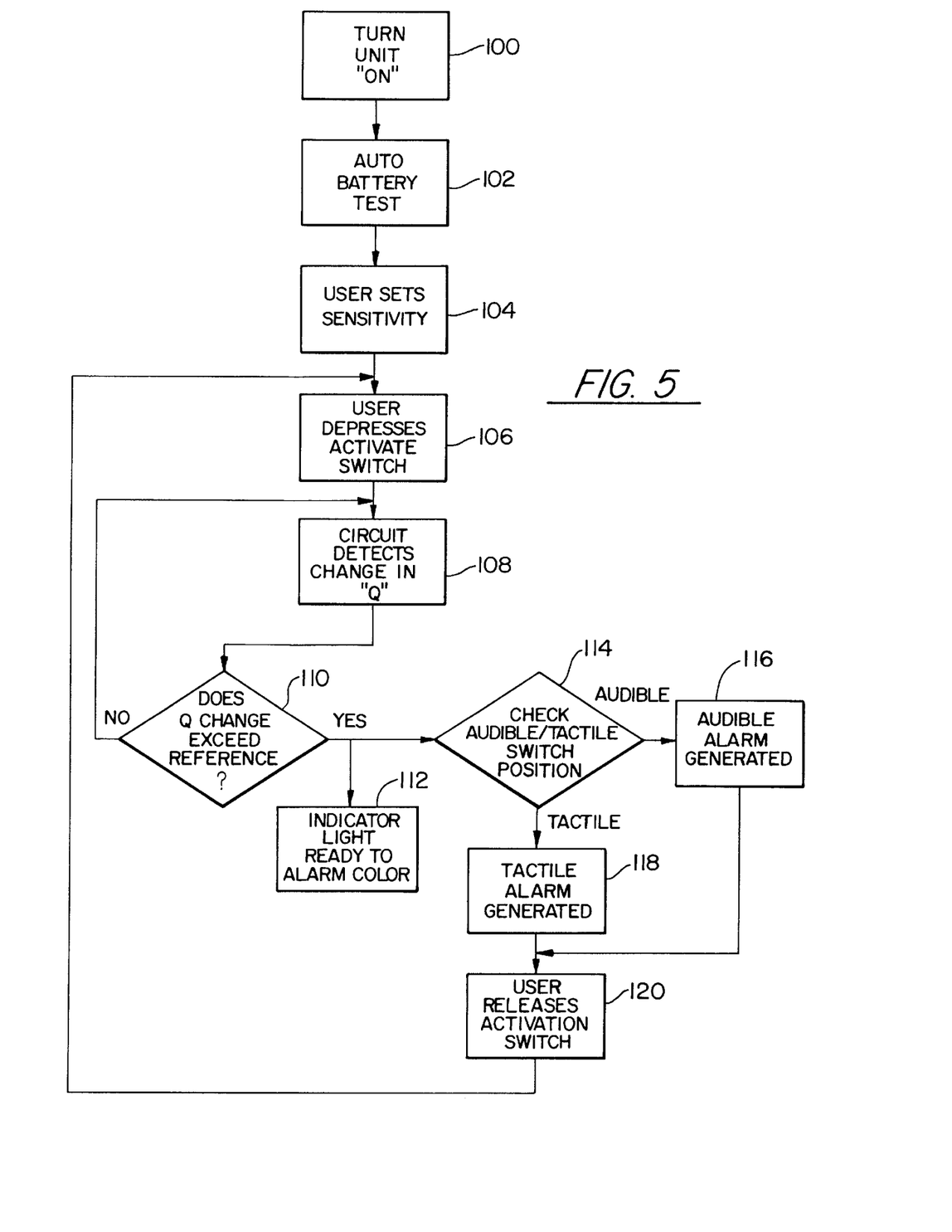
FIG. 5 is a flow diagram of the operation of one embodiment of the present invention.

Referring to FIG. 5, the operation as described in detail above is summarized in the illustrated flow diagram. The unit is activated 100, if the battery voltage is above a minimum value 102, the user can set the sensitivity 104. To detect metal, the user depresses the activate switch 106, the circuit detects the Q of the oscillator circuit 108. Upon proximity to metal, if the change in Q is greater the preset sensitivity value 110, the visual indicator changes color from ready to alarm 112. Depending upon the audible/tactile switch position setting 114, the audio alarm is activated 116 or the tactile alarm is activated 118. The user can then release the activation switch 120, and the unit will be ready for the next use, at the same preset sensitivity level.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A compact metal detector for detection of ferrous and non-ferrous metal objects, said detector comprising:

a tuned oscillator circuit, including a coil having a winding, for generating a field having a preselected frequency;

a circuit for detecting a predetermined change in a quality factor Q of said tuned circuit responsive to a ferrous or non-ferrous metal object in said field, wherein said circuit detects when a metal object of pre-selected size is within a pre-selected distance from said coil by detecting a change in said quality factor Q of said tuned oscillator circuit greater than a pre-set threshold; and a tactile indicator for receiving an output of said detecting circuit and exclusively operable in response to said detecting of said predetermined change in said quality factor Q and vibrating as a tactual output signal indicative of said ferrous or non-ferrous metal object in said field, and a compact housing, within which said oscillator circuit, said detecting circuit and said tactile indicator are mounted, the vibration of said tactile indicator being tactually felt when the housing is held by an operator, whereby others are prevented from perceiving the detection of said metal object.

2. The metal detector of claim 1, further comprising a battery power supply.

3. The metal detector of claim 2, comprising only a single switch, said single switch being operable for activating said metal detector.

4. The metal detector of claim 3, wherein said tuned circuit comprises a tuned inductive-capacitive circuit having a coil with a single winding.

5. The metal detector of claim 4, wherein said tuned circuit and said tactile indicator are mounted adjacent one another.

6. The metal detector of claim 1, wherein said tactile indicator comprises an electric motor having a rotating offset counterweight for causing vibration of said metal detector, said quality factor Q being substantially immune to perturbation responsive to operation of said motor.

7. The metal detector of claim 6, wherein said tuned circuit and said motor are mounted adjacent one another.

8. The metal detector of claim 1, comprising only a single switch, said single switch being operable for activating said metal detector.

9. The metal detector of claim 1, wherein said tuned circuit comprises a tuned inductive-capacitive circuit having a coil with a single winding.

10. The metal detector of claim 1, wherein said tuned circuit and said tactile indicator are mounted adjacent one another.

* * * * *